United States Patent
Seto

(10) Patent No.: US 7,542,176 B2
(45) Date of Patent: Jun. 2, 2009

(54) READING/RECORDING APPARATUS AND READING/RECORDING CONTROL METHOD

(75) Inventor: Noriaki Seto, Ibaraki (JP)

(73) Assignee: Canon Kabushiki Kaisha (JP)

( * ) Notice: Subject to any disclaimer, the term of this patent is extended or adjusted under 35 U.S.C. 154(b) by 838 days.

(21) Appl. No.: 10/745,329

(22) Filed: Dec. 23, 2003

(65) Prior Publication Data

US 2004/0190082 A1     Sep. 30, 2004

(30) Foreign Application Priority Data

Dec. 25, 2002     (JP)     ............... 2002-375140

(51) Int. Cl.
 *H04N 1/21* (2006.01)
 *H04N 1/23* (2006.01)
 *G06F 15/00* (2006.01)

(52) U.S. Cl. .................................. 358/296; 358/1.14

(58) Field of Classification Search ................. 358/296, 358/400, 473, 1.14, 1.13
 See application file for complete search history.

(56) References Cited

U.S. PATENT DOCUMENTS

| | | | |
|---|---|---|---|
| 5,124,800 A * | 6/1992 | Hashimoto | 358/296 |
| 5,651,623 A | 7/1997 | Stodder et al. | |
| 5,889,597 A * | 3/1999 | Ara et al. | 358/473 |
| 5,954,326 A | 9/1999 | Gaarder et al. | |
| 6,029,970 A | 2/2000 | Hwang | |
| 6,520,700 B1 | 2/2003 | Iwata | |
| 6,633,417 B1 | 10/2003 | Chang et al. | |
| 6,987,574 B2 | 1/2006 | Potakowskyj | |
| 7,177,962 B2 | 2/2007 | Seto | |

FOREIGN PATENT DOCUMENTS

| | | |
|---|---|---|
| JP | 60-016763 A | 1/1985 |
| JP | 63-140377 A | 6/1988 |

(Continued)

OTHER PUBLICATIONS

Japanese Office Action issued in JP 2002-375140; Office Action mailing date—Oct. 11, 2005; 2 pages.

*Primary Examiner*—Douglas Q Tran
(74) *Attorney, Agent, or Firm*—Rossi, Kimms & McDowell LLP

(57) ABSTRACT

There is provided a reading/recording apparatus capable of ensuring that a reading device and a recording device do not collide when the apparatus is miniaturized to thereby protect the reading unit and the recording unit by having the reading device and the recording device share a moving space on a shared conveying path used as both a conveying for an original and a conveying for a recording sheet. The original is conveyed to a reading position on the shared conveying path. The reading unit is freely movable between the reading position and a reading standby position away from the reading position, and reads an image of the original at the reading position. The recording medium is conveyed to a recording position on the shared conveying path. The recording device moves within the same space on the shared conveying path as the reading unit, is freely movable between the recording position and a recording standby position away from the recording position, and records an image on the recording medium at the recording position. The operation of the recording unit is inhibited at the start of a reading operation by the reading unit.

8 Claims, 9 Drawing Sheets

FOREIGN PATENT DOCUMENTS

| | | |
|---|---|---|
| JP | 2-257755 A | 10/1990 |
| JP | 2-286539 A | 11/1990 |
| JP | 06-086001 A | 3/1994 |
| JP | 11-187212 A | 7/1999 |
| JP | 11187212 A | 7/1999 |
| JP | 2000-299767 A | 10/2000 |

* cited by examiner

READING/RECORDING APPARATUS AND READING/RECORDING CONTROL METHOD

BACKGROUND OF THE INVENTION

1. Field of the Invention

The present invention relates to a reading/recording apparatus and a reading/recording control method.

2. Description of the Related Art

In recent years, as terminal apparatuses have been made smaller in size, there have also been demands for miniaturization of information terminal apparatuses. In particular, in a reading/recording apparatus such as a facsimile apparatus for domestic use, a sheet conveying mechanism used for a reading operation and a sheet conveying mechanism used for a recording operation are completely separate from each other, so that a space where a reading unit reads an original (document) during transmission is separate from a space where a recording unit performs the recording operation during reception.

FIG. 10 is a cross-sectional view showing the construction of a conventional reading/recording apparatus. In this conventional reading/recording apparatus, recording sheets 301 are placed on a recording sheet holding member 303 and are fed sheet by sheet by a recording sheet feeding roller 304 and a separating mechanism. The fed recording sheet is conveyed to a recording section 306 by a conveying roller 305 and is discharged from the apparatus (in the direction shown by the arrow B in FIG. 10) by a discharge roller 307 while an image is being formed on the recording sheet by a recording section such as an inkjet cartridge.

On the other hand, originals 302 are placed on an original holding member 308 and are set on a wedge-shaped abutting section formed of an original separating roller 309 and a separating arm 313. When the original separating roller 309 rotates according to an image reading instruction, out of the originals held at the abutting section, only an original in contact with the original separating roller 309 is separated using friction and is conveyed.

The separated and conveyed original 302 is further conveyed by an original feeding roller 310, a discharge roller 312, and opposing rollers while being held therebetween. While an image on the original 302 is being read by a contact image sensor 311, the original 302 is discharged from the apparatus (in the direction shown by the arrow A in FIG. 10).

For a reading/recording apparatus such as a copier or a facsimile apparatus, various functions and improvements have been implemented to make such apparatus more convenient to use, according to demands from customers. One of such demands is for miniaturization of the apparatus. For users who wish to make effective use of limited space, apparatus size is especially important when purchasing equipment.

However, in the conventional reading/recording apparatus described above, the sheet conveying mechanism for the reading operation and the sheet conveying mechanism for the recording operation are completely separate from each other, that is, the space in which the reading unit reads the original during transmission is separate from the space in which the recording unit performs the recording operation during reception, so that it is necessary to provide separate physical spaces for the reading operation and the recording operation. This makes it difficult to miniaturize the apparatus.

On the other hand, there is a known technique for reducing apparatus size by using a single reading/recording path mechanism with a shared conveying path on which both originals and recording sheets are conveyed. Specifically, by conveying originals using the same conveying mechanism used for conveying recording sheets, it is possible to omit a feed roller, discharge roller, original driving motor, original detecting sensor, and the like that are used for conveying originals. However, in the case of an inkjet reading/recording apparatus where recording is performed by moving the recording unit, it is necessary to drive the reading unit and the recording unit in different spaces, so that a sufficient reduction in apparatus size cannot be made.

To further miniaturize a reading/recording apparatus, studies are being performed to make the reading unit freely movable between a reading position located on a shared conveying path for conveying originals and recording sheets and a reading standby position receded from the reading position where the reading unit waits until a read instruction is issued and make the recording unit that moves in the main scanning direction and the reading unit share a moving space. However, if it is simply arranged that the recording unit and the reading share a moving space, when a reading operation and a recording operation occur simultaneously, the reading unit and the recording unit collide, which in some cases results in damage.

For example, there is the risk that when a reading operation is performed, the reading unit is disposed at the reading position located on the shared conveying path. If on this occasion, a conveyed medium detecting sensor detects a conveyed medium on the shared conveying path, irrespective of the reading operation being performed, the conveyed medium will be erroneously detected as a recording sheet and the recording operation will start. Also, in the case where a recording operation is performed after the reading/recording apparatus has stopped with an original still present on the conveying path due to a jam, power failure, or any other reason, there is the risk of the original being damaged by the recording unit that moves in the main scanning direction.

SUMMARY OF THE INVENTION

It is an object of the present invention to provide a reading/recording apparatus and a reading/recording control method which are capable of ensuring that a reading device and a recording device do not collide when the apparatus is miniaturized to thereby protect the reading unit and the recording unit by having the reading device and the recording device share a moving space on a shared conveying path used as both a conveying path for an original and a conveying path for a recording sheet.

To attain the above object, in a first aspect of the present invention, there is provided a reading/recording apparatus comprising a shared conveying path used as both a conveying path for an original and a conveying path for a recording medium, an original conveying device that conveys the original to a reading position on the shared conveying path, a reading device that is freely movable between the reading position and a reading standby position away from the reading position and reads an image of the original at the reading position, a recording medium conveying device that conveys the recording medium to a recording position on the shared conveying path, a recording device that moves within the same space on the shared conveying path as the reading device, is freely movable between the recording position and a recording standby position away from the recording position, and records an image on the recording medium at the recording position, and a control device that inhibits an operation of the recording device at a start of a reading operation by the reading device.

According to the first aspect of the present invention, it is possible to ensure that the reading device and the recording device do not collide when the apparatus is miniaturized to thereby protect the reading unit and the recording unit by having the reading device and the recording device share a moving space on a shared conveying path used as both a conveying for an original and a conveying for a recording medium.

Preferably, the reading/recording apparatus comprises an operation mode storage device that stores an operation mode, and wherein the control device is responsive to the stored operation mode having been updated to a reading mode, for inhibiting recording of an image by the recording device.

Also preferably, the recording device is freely movable in a main scanning direction-on the shared conveying path, and the control device causes the recording device to stay at the recording standby position away from the recording position during the reading operation by the reading device.

Also preferably, the reading/recording apparatus comprises a rotary shaft extending in a main scanning direction, and wherein the reading device is freely rotatable about the rotary shaft between the reading position and the reading standby position, and the control device is responsive to the reading device having read an image of the original at the reading position on the shared conveying path, for causing the reading device to the reading standby position away from the reading position.

Also preferably, the reading/recording apparatus comprises a conveyed medium detecting device that detects a conveyed medium on the shared conveying path, and a forcible discharging device operable when the conveyed medium has been detected on the shared conveying path by the conveyed medium detecting device at the start of the reading operation, to forcibly discharge the conveyed medium.

According to this preferred form, it is possible to avoid damage to the original or the occurrence of a paper jam due to the recording device moving in a state where the original remains on the shared conveying path due to a paper jam, power failure, or other reason. Further, it is also possible to reduce the time spent on exclusive control operation of one of the reading device and the recording device within the shared moving space, thereby suppressing delays in reading and recording operations.

More preferably, the reading/recording apparatus further comprises a notification device operable when the conveyed medium has been detected on the shared conveying path by the conveyed medium detecting device at the start of the reading operation, to issue a notification that the conveyed medium has been detected.

To attain the above object, in a second aspect of the present invention, there is provided a reading/recording control method for a reading/recording apparatus including a shared conveying path used as both a conveying path for an original and a conveying path for a recording medium, a reading device that is freely movable between a reading position on the shared conveying path and a reading standby position away from the reading position and reads an image of the original, and a recording device that moves within the same space on the shared conveying path as the reading device, is freely movable between a recording position on the shared conveying path and a recording standby position away from the recording position, and records an image on the recording medium, the method comprises an original conveying step of conveying the original to the reading position, a reading step of reading an image of the original at the reading position by the reading device, a recording medium conveying step of conveying the recording medium to the recording position, a recording step of causing the recording device to record an image on the recording medium at the recording position, and a recording inhibiting step of inhibiting an operation of the recording device at a start of a reading operation by the reading device.

According to the second aspect of the present invention, substantially the same effects as those by the first aspect described above can be provided.

The above and other objects of the present invention will become more apparent from the following detailed description taken in conjunction with the accompanying drawings.

DETAILED DESCRIPTION OF THE PREFERRED EMBODIMENTS

The present invention will now be described in detail with reference to the accompanying drawings showing a preferred embodiment thereof.

Figure 1:
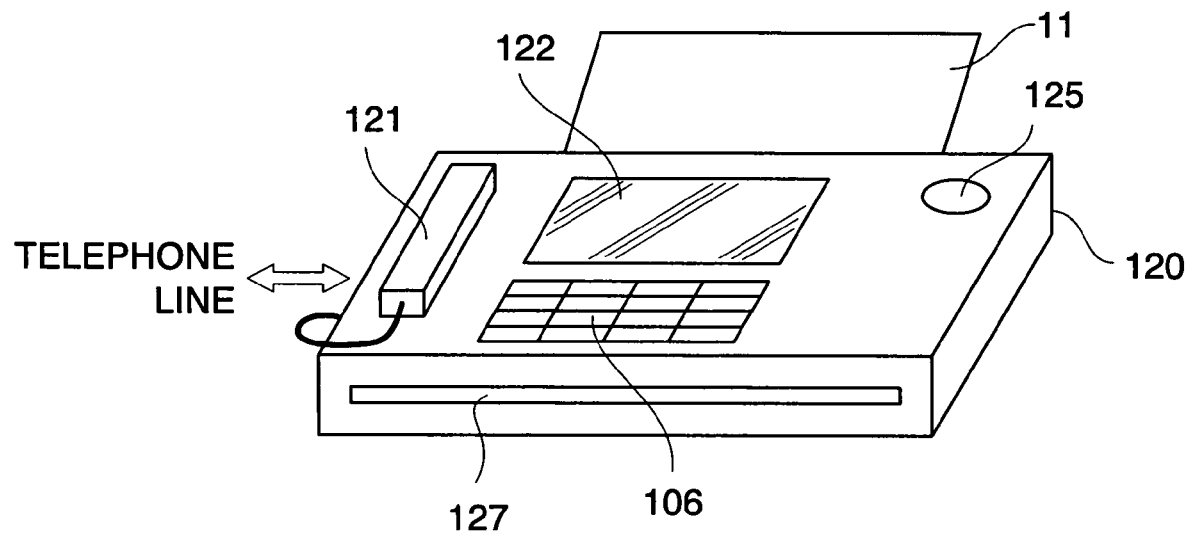
FIG. 1 is a perspective view showing the external appearance of a multifunction communication apparatus as a reading/recording apparatus according to an embodiment of the present invention.

FIG. 1 is a perspective view showing the external appearance of a reading/recording apparatus according to the embodiment. The reading/recording apparatus according to the present embodiment is applied to a multifunction communication apparatus that has a facsimile communication function and a copying function. This multifunction communication apparatus has a casing 120 with a discharge opening 127 provided in a front side thereof and an original tray 11 provided on a rear side thereof. A handset 121, a display 122, an operating section 106, an original discharge button (discharge key) 125, and so forth are provided on an upper surface of the casing 120.

The display 122 displays the state of the multifunction communication apparatus, a telephone number, and so forth. The operating section 106 is comprised of a plurality of keys and is used to input a telephone number or various kinds of setting information and to give instructions for operations. The original discharge button 125 is pressed to discharge an original or a recording sheet.

Figure 2:
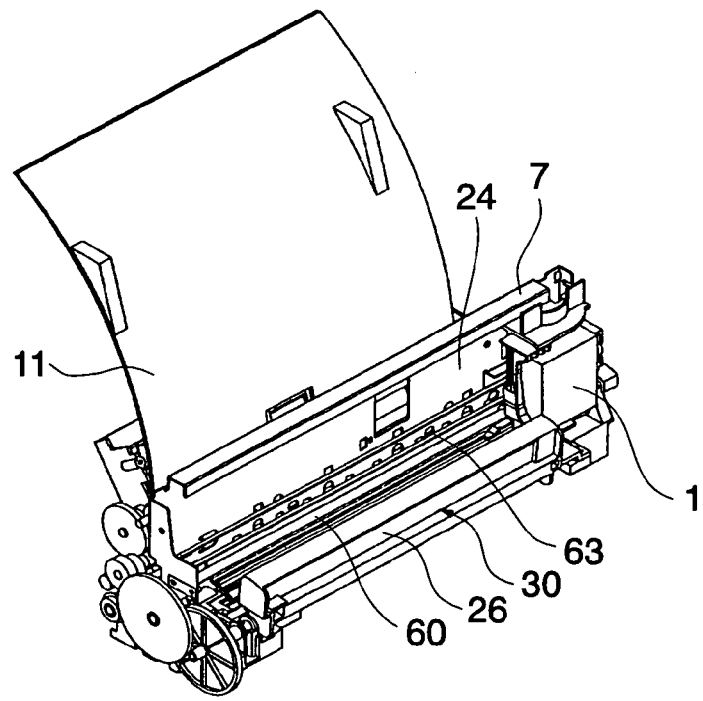
FIG. 2 is a perspective view showing the internal construction of the multifunction communication apparatus of FIG. 1.

FIG. 2 is a perspective view showing the internal construction of the multifunction communication apparatus of FIG. 1.

Figure 3:
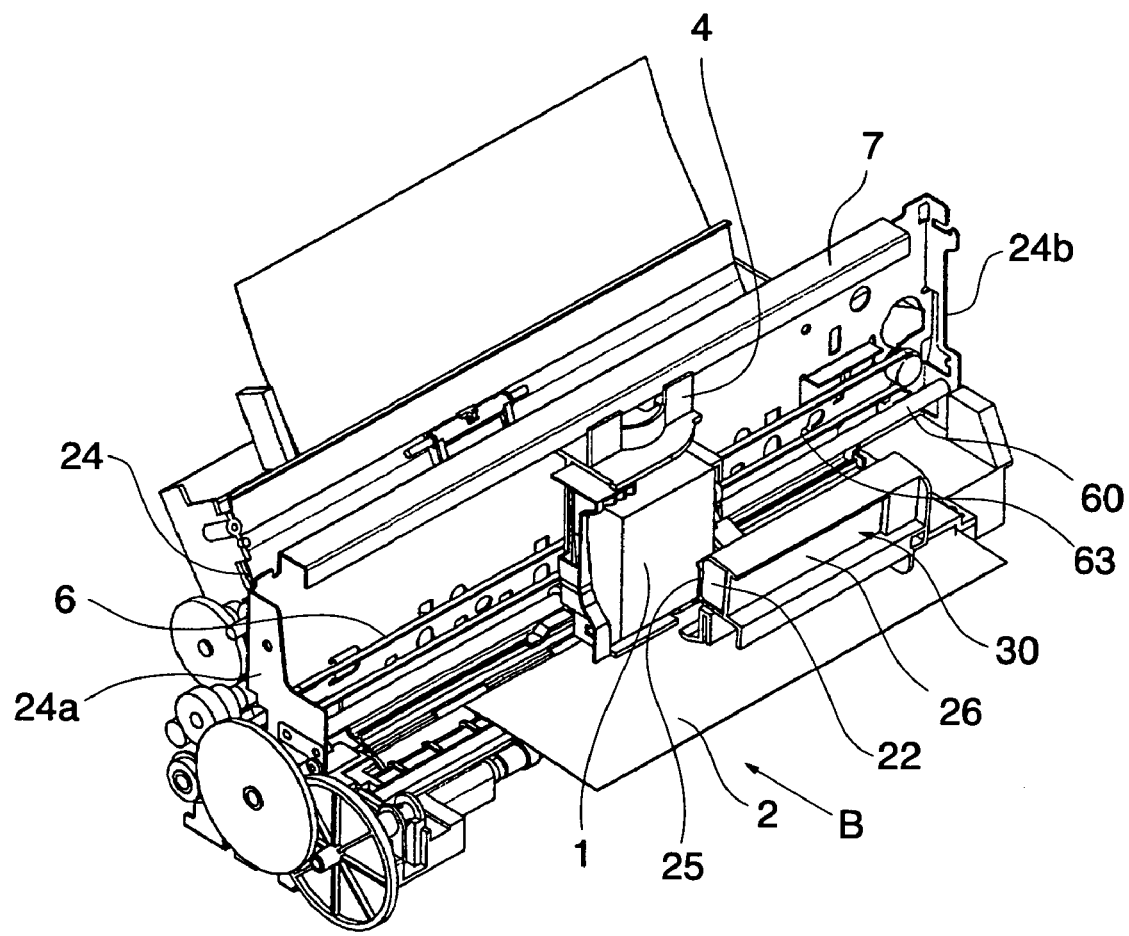
FIG. 3 is a perspective view showing the internal construction of the multifunction communication apparatus of FIG. 1 in a state where a recording unit is operating.
Figure 4:
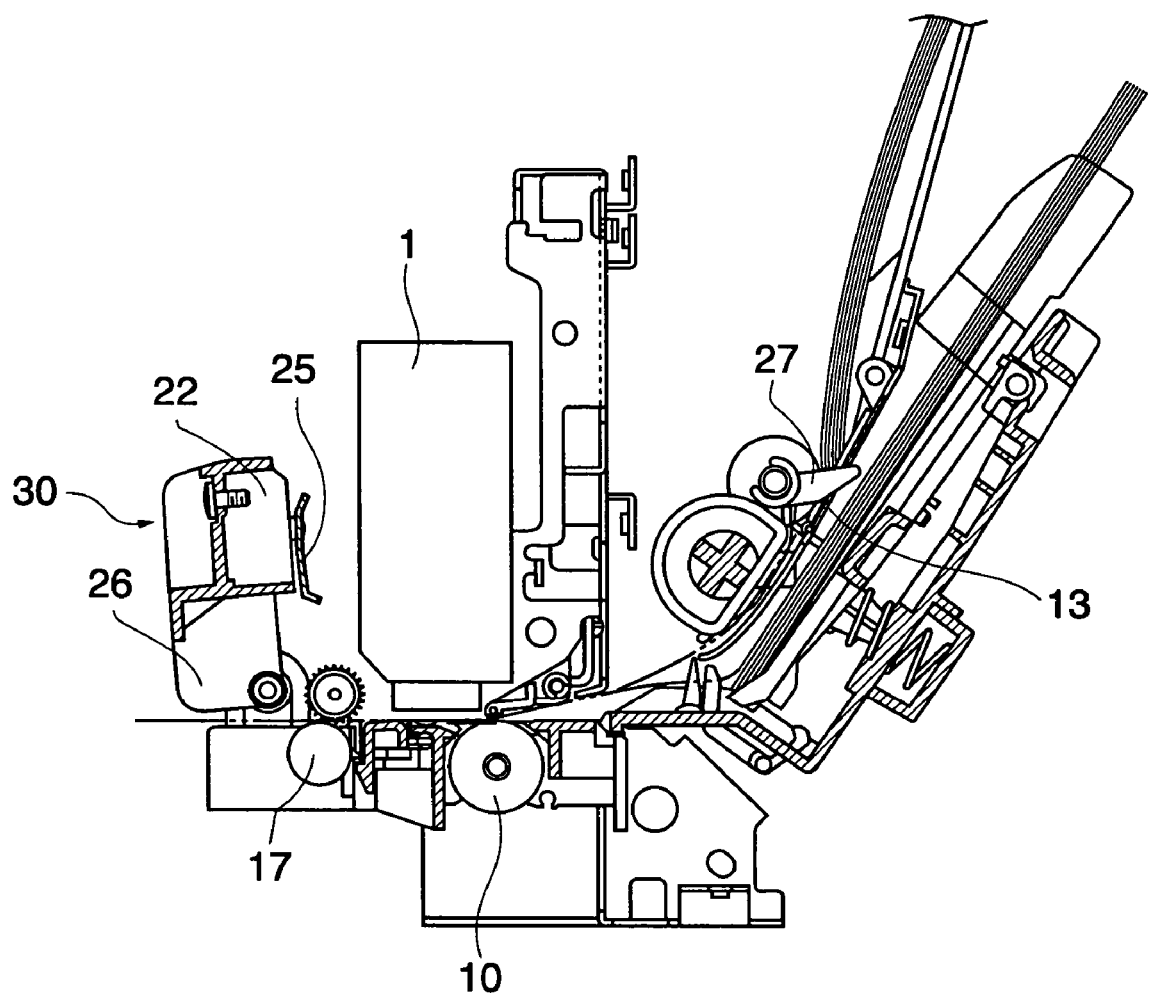
FIG. 4 is a cross-sectional side view' showing the internal construction of the multifunction communication apparatus of FIG. 1 in the state where the recording unit is operating.
Figure 5:
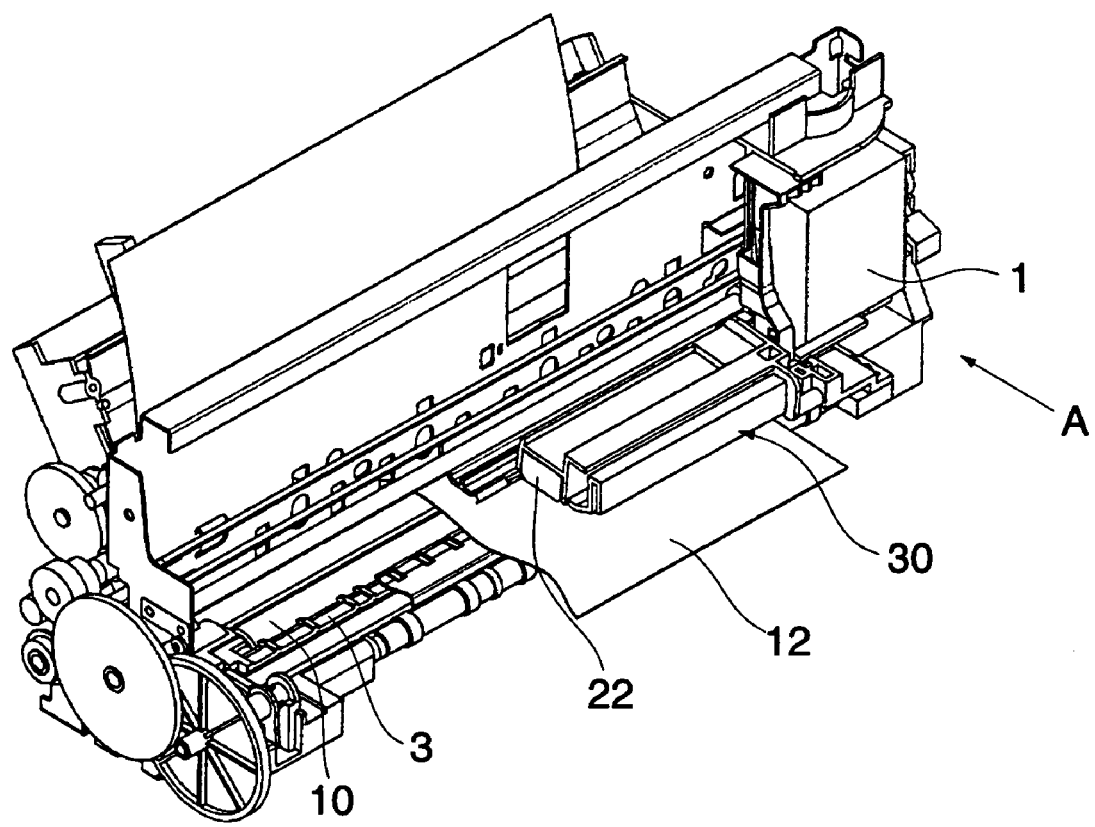
FIG. 5 is a perspective view showing the internal construction of the multifunction communication apparatus of FIG. 1 in a state where the reading unit is operating.
Figure 6:
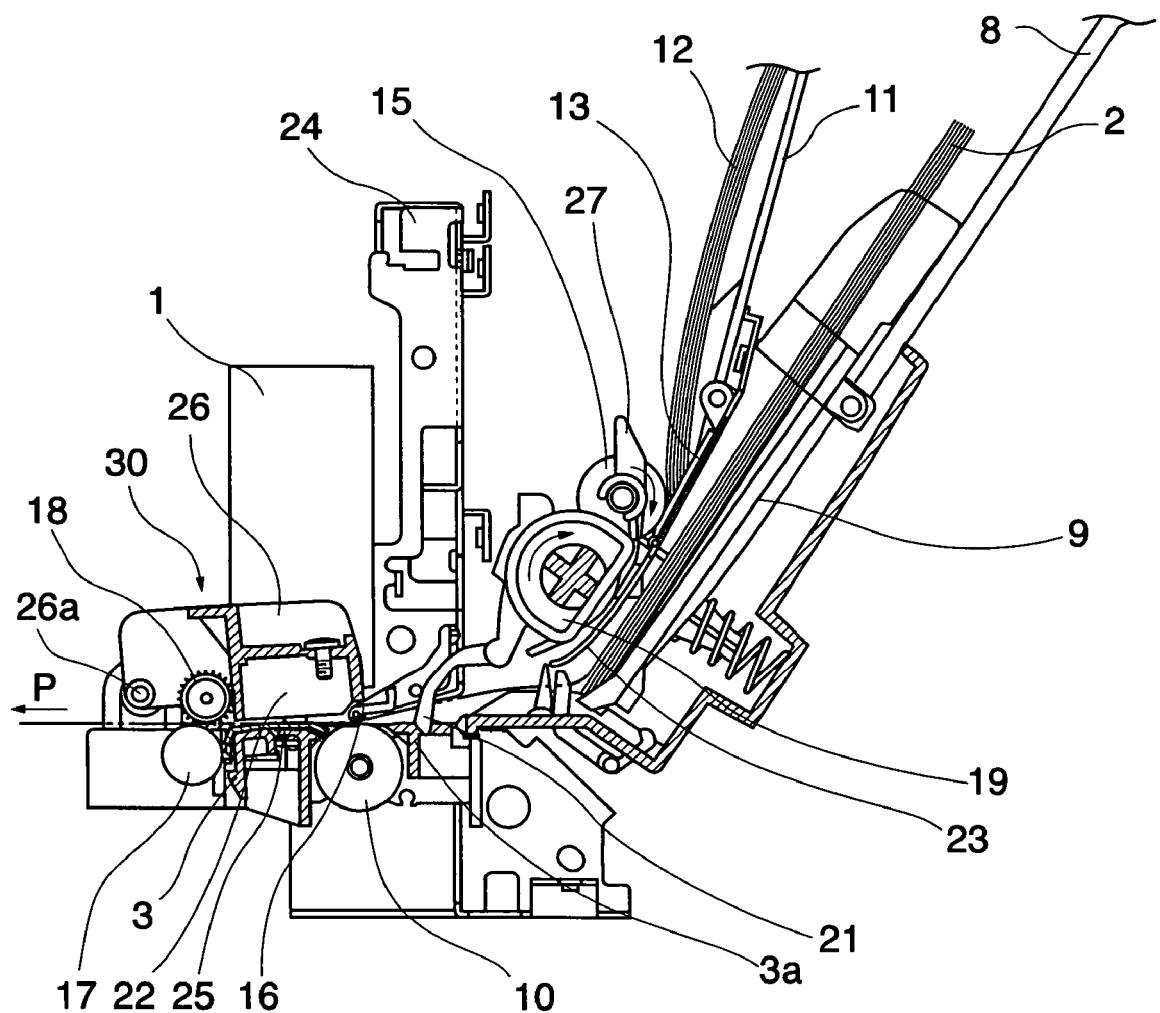
FIG. 6 is a cross-sectional side view showing the internal construction of the multifunction communication apparatus of FIG. 1 in the state where the reading unit is operating.

FIG. 2 shows a state where neither a recording sheet nor an original has been set and neither a reading unit nor a recording unit is operating, so that both the units are located in receded positions. FIG. 3 is a perspective view showing the internal construction of the multifunction communication apparatus of FIG. 1 in a state where the recording unit is operating. FIG. 4 is a cross-sectional side view showing the internal construction of the multifunction communication apparatus of FIG. 1 in a state where the recording unit is operating. FIG. 5 is a perspective view showing the internal construction of the multifunction communication apparatus of FIG. 1 in a state where the reading unit is operating. FIG. 6 is a cross-sectional side view showing the internal construction of the multifunction communication apparatus of FIG. 1 in a state where the reading unit is operating.

In FIGS. 2 to 6, reference numeral 1 designates an ink cartridge (the recording unit) that carries out recording, 3 a platen that is disposed in opposition to a surface of an original during a reading operation and to a surface of a recording sheet during a recording operation; 3a a platen supporting member that supports the platen 3; 8 a recording sheet tray on which recording sheets 2 are placed; 9 a pressing plate that presses the recording sheets 2 onto a recording sheet separating roller 19 when a recording sheet is to be separated; 10 a feed roller that feeds a conveyed medium (an original or a recording sheet) when reading or recording is carried out; 11 an original tray that holds originals, 13 a separating arm that separates an original 12; 15 an original separating roller that applies a force required to separate an original; 16 a pinch roller that supplements a driving force of the feed roller 10 during the feeding of the conveyed medium; 17 a discharge roller that discharges the conveyed medium out of the apparatus during reading and recording; 18 a spur that supplements a driving force of the discharge roller 17 when the conveyed medium is discharged; 19 a recording sheet separating roller that applies a force required to separate a recording sheet; and 21 a conveyed medium detecting sensor (paper edge sensor or "PES") that detects the presence of a conveyed medium during reading and during recording.

Further, reference numeral 22 designates a contact image sensor (CS) that carries out a reading operation; 23 an original lower guide member that guides an original 12; 24 a chassis; 25 a white reference determining member that determines a white reference level of an image read by the contact image sensor (CS) 22 during an operation that reads an original; and 26 a contact image sensor holder (CS holder) that supports the CS 22 and the white reference determining member 25, and is also supported for free rotation with respect to the apparatus main body about a rotary shaft 26a extending in a main scanning direction. A reading unit 30 is comprised of the CS holder 26, the CS 22, and the white reference determining member 25. During a reading operation, the CS holder 26 rotates to a reading position close to a recording section (that is, a recording position) on the platen 3, and an image of the original that passes a shared conveying path is read by the CS 22. On the other hand, during a recording operation, the CS holder 26 rotates away from the reading position on the platen 3 to a reading standby position, and a recording unit 1 that is freely movable on the platen 3 in the main scanning direction carries out a recording operation on the recording sheet that passes the shared conveying path.

Reference numeral 27 designates an original detecting sensor (DS: document sensor) used for detecting the presence of an original on the original tray 11. During a reading operation, a document is detected by the DS 27 and the PES 21 detects whether a conveyed medium (an original or a recording sheet) has passed a predetermined position on the shared conveying path. It should be noted that when the apparatus is in reading mode in response to a start request for a reading operation being issued, in which an original is conveyed, if the PES 21 is not turned on and the DS 27 remains on, it is judged that an abnormality has occurred during conveying of the original, and an original jam (hereinafter referred to as "a paper jam") flag is set.

The recording unit 1 is provided therein with an ink tank and an ink head (recording head), and records an image based on image information by injecting ink from the ink tank onto a recording sheet 2 through nozzles provided on the ink head. The recording unit 1 is detachably attached to a carriage 4 that is guided by a guide rail 7 that is formed in an inverted U-shape integrally with the top of the chassis 24 and a guide shaft 60 supported by side plates 24a, 24b at both ends of the chassis 24. The carriage 4 is fixed to a carriage belt 63 and is driven by a carriage motor to move the recording unit 1 in the main scanning direction.

The reading operation and recording operation of the multifunction communication apparatus with the above construction will be described next. First, when an original 12 is set on the original tray 11 during a reading operation, the original 12 is detected by the original detecting sensor (DS) 27 that is located near the original separating roller 15.

If the user gives an instruction for the start of a reading operation via the operating section 106 in a state where the original 12 has been detected by the original detecting sensor 27, "reading mode" indicative of a reading operation being carried out is stored in a storage section 107 shown in FIG. 7 (described later) as an operation mode, and a reading operation is started. Under the control of a CPU 100 in FIG. 7, the original separating roller 15 is driven to cause one original 12 to be separated by the separating arm 13, and the separated original is fed to the reading position.

At the same time, the CS holder 26 is rotated about the rotary shaft 26a towards the platen 3 by the driving force of the feed roller 10, to bring the CS 22 to the reading position. In this state, the feed roller 10 conveys the original 12 on the shared conveying path and the CS 22 reads an image from the original 12 until a trailing edge of the original 12 is detected by the PES 21. The image read by the CS 22 is converted into image information by a predetermined method and the image information is stored in the storage section 107 shown in FIG. 7.

When the reading of the image from the original 12 has been completed, the original 12 is discharged from the apparatus by the discharge roller 17. When the user has given an instruction for a reading operation for a plurality of originals, after the discharging of an original has been completed, the next original 12 is separated and fed and an image of this next original 12 is read in the same way. When the reading of images has been completed for the number of originals 12 indicated by the user, the CS holder 26 is finally rotated to the reading standby position away from the reading position on the platen 3, and the reading operation is completed.

Next, in a recording operation, when the user gives an instruction for the start of a recording operation using the operating section 106, if the CS holder 26 has been rotated to the reading position, before the recording operation starts, the CS holder 26 is receded from the reading position to the reading standby position. After this, "recording mode" indicative of a recording operation being carried out is stored in the storage section 107 shown in FIG. 7 as the operation mode. Consequently, the ink cartridge (recording unit) 1 can move in the main scanning direction at and in vicinity of the recording section on the platen 3, so that recording can be carried out on the recording sheet 2 that passes on the shared conveying path.

Figure 7:
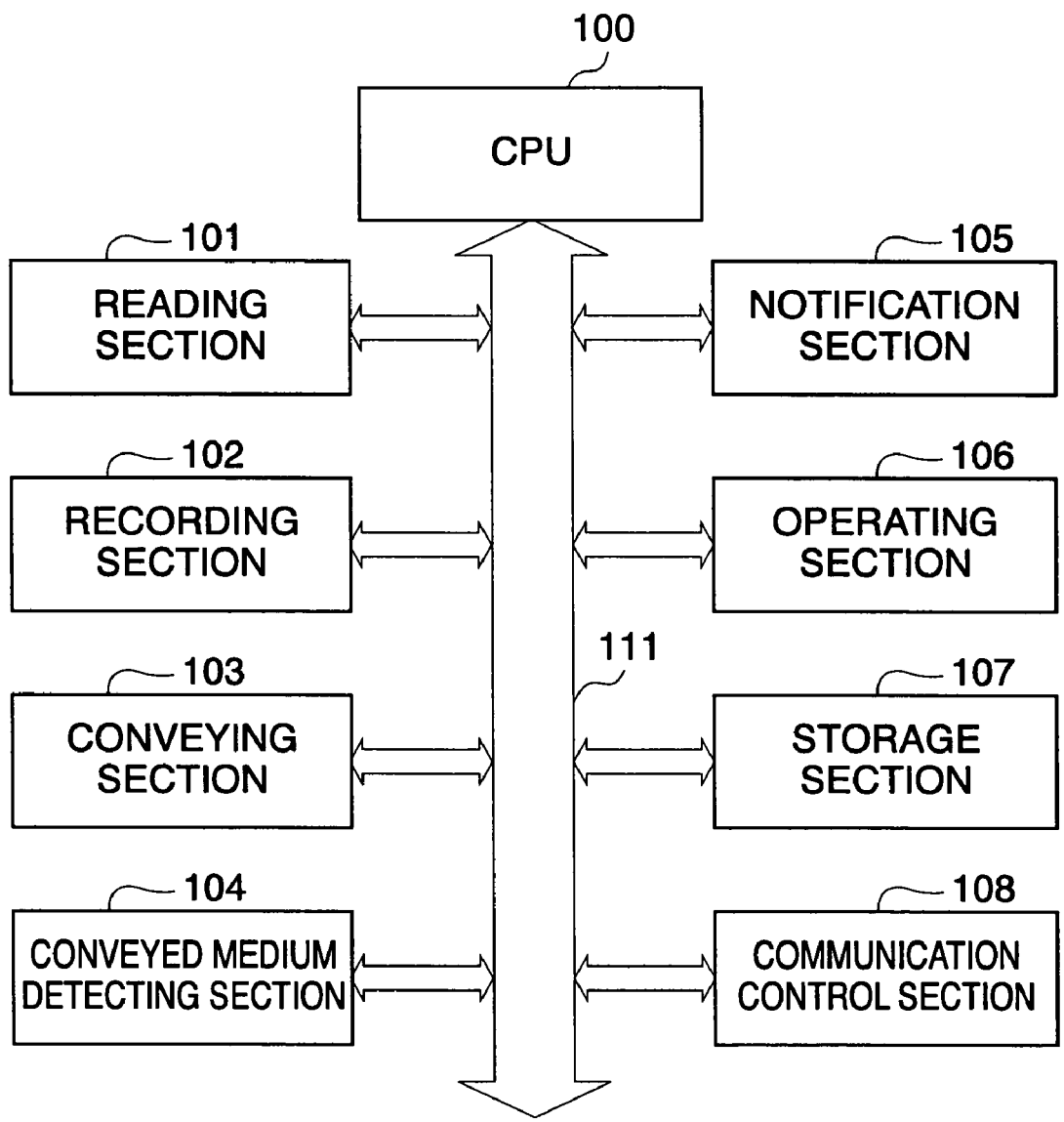
FIG. 7 is a block diagram showing the electrical construction of the multifunction communication apparatus of FIG. 1.

After this, recording sheets 2 are placed on the recording sheet tray 8 and when one recording sheet 2, out of the recording sheets 2 that are pressed by the pressing plate 9, has been separated by the recording sheet separating roller 19 under the control of the CPU 100 shown in FIG. 7, the recording sheet 2 is fed to the recording section (recording position) on the platen 3.

Next, until the trailing edge of the recording sheet 2 conveyed by the feed roller 10 is detected by the PES 21, the recording unit 1 records an image on the recording sheet 2 based on image information stored in the storage section 107 shown in FIG. 7. When the recording of the image has been completed, the recording sheet is discharged from the apparatus by the discharge roller 17. When a recording operation is to be performed for a plurality of recording sheets 2, after the discharging of a recording sheet on which an image has been recorded has been completed, the processes for separating and feeding the next recording sheet 2 on which an image is to be recorded, recording an image, and discharging the recording sheet are repeated for the remaining number of sheets.

Here, when the recording unit 1 is not performing a recording operation, the recording unit 1 stands by at a home position (recording standby position) (a position shown by the arrow A in FIG. 5) and a cap is placed over the recording head of the recording unit 1 to prevent clogging of the recording head caused by drying of the ink. When a recording operation is carried out, the cap is removed, the recording unit 1 is moved to a recovering operation position (a position shown by the arrow B in FIG. 3), and after an initialization operation, such as a recovering operation of the recording head, has been performed, the recording operation starts. Aside from the initialization operation of the recording unit 1 described above, even if no user instruction has been given via the operating section 106, other initialization operations (such as a recovering operation of the ink cartridge 1 and a remaining ink detecting operation) are executed according to predetermined conditions. Also, as for the timing for carrying out a recording operation, the recording unit 1 starts an initialization operation when the PES 21 detects a recording sheet 2.

In this way, in the case where during a reading operation the reading unit 30 including the CS holder 26 moves in the same space in which the recording unit 1 moves during a recording operation, there was conventionally the danger that when a reading operation is carried out, an original 12 detected on the shared conveying path by the PES 21 is mistakenly identified as a recording sheet 2 and an unexpected recording operation would start. With the present embodiment, however, the above situation is avoided.

FIG. 7 is a block diagram showing the electrical construction of the multifunction communication apparatus of FIG. 1. This multifunction communication apparatus is comprised of the CPU 100, a reading section 101 including the reading unit 30 that reads an original, a recording section 102 including the recording unit 1 that records an image on a recording sheet based on image information received via facsimile communication and/or image information of an original read by the reading unit 30, a conveying section 103 that conveys originals and recording sheets along the shared conveying path, a conveyed medium detecting section 104 including the PES 21 and the DS 27, a notification section 105 that gives a notification when a conveyed medium has been detected by the conveyed medium detecting section 104 and also notifies a user of various states of the apparatus, an operating section 106 that is operated by the user to input various information and to give instructions for operations of the apparatus, a communication control section 108 that controls transmission and reception of image information and communication carried out by the handset 121 via a telephone line, and the storage section 107, with these various components being interconnected via a bus 111. An operation mode such as "reading mode" or "recording mode" is stored in the storage section 107, along with various states of the apparatus and image information based on images read by the reading unit 30. A control program, described later, is also stored in a ROM inside the storage section 107.

Figure 8:
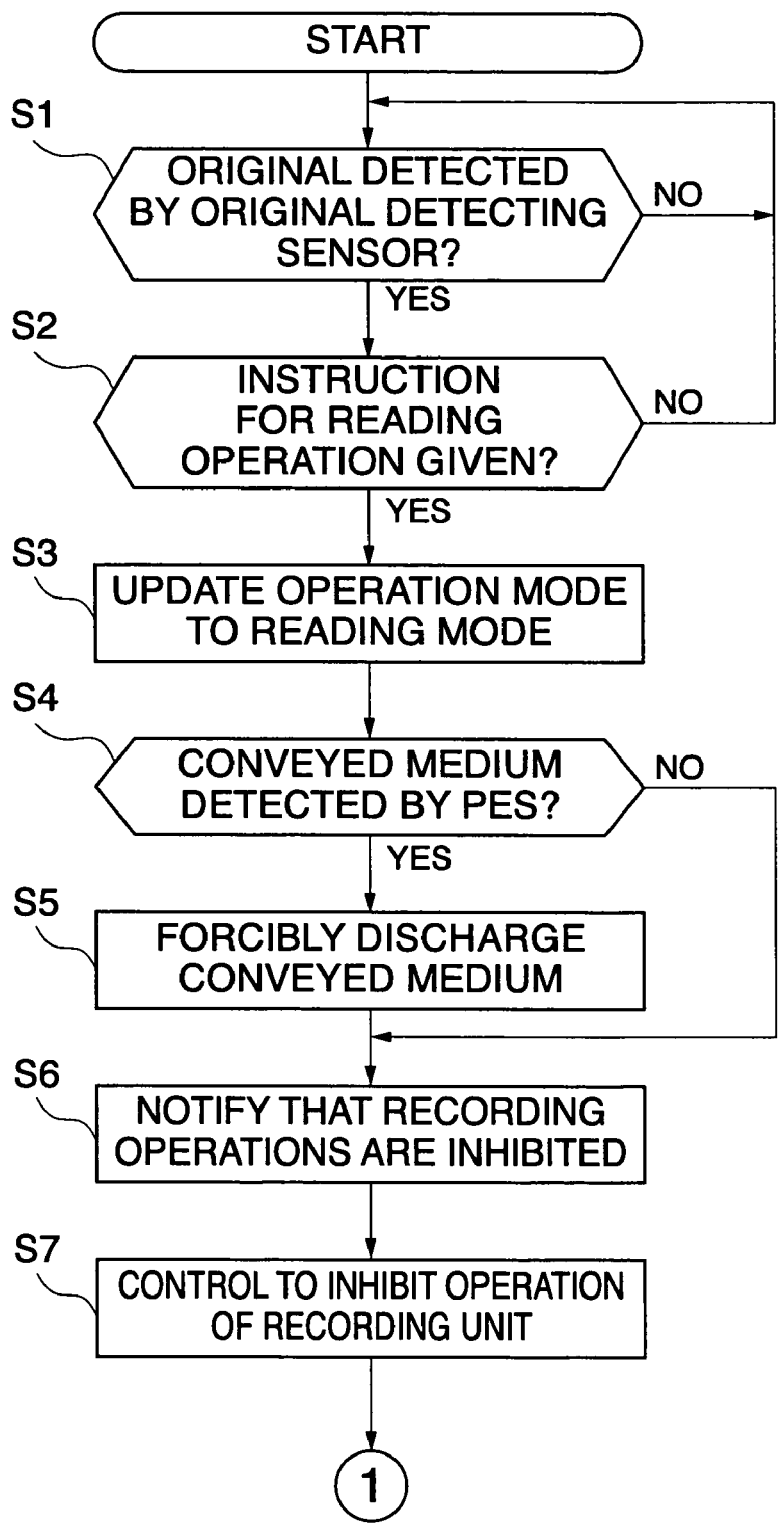
FIG. 8 is a flowchart showing the procedure of a control process for inhibiting a recording operation during a reading operation by the multifunction communication apparatus of FIG. 1.
Figure 9:
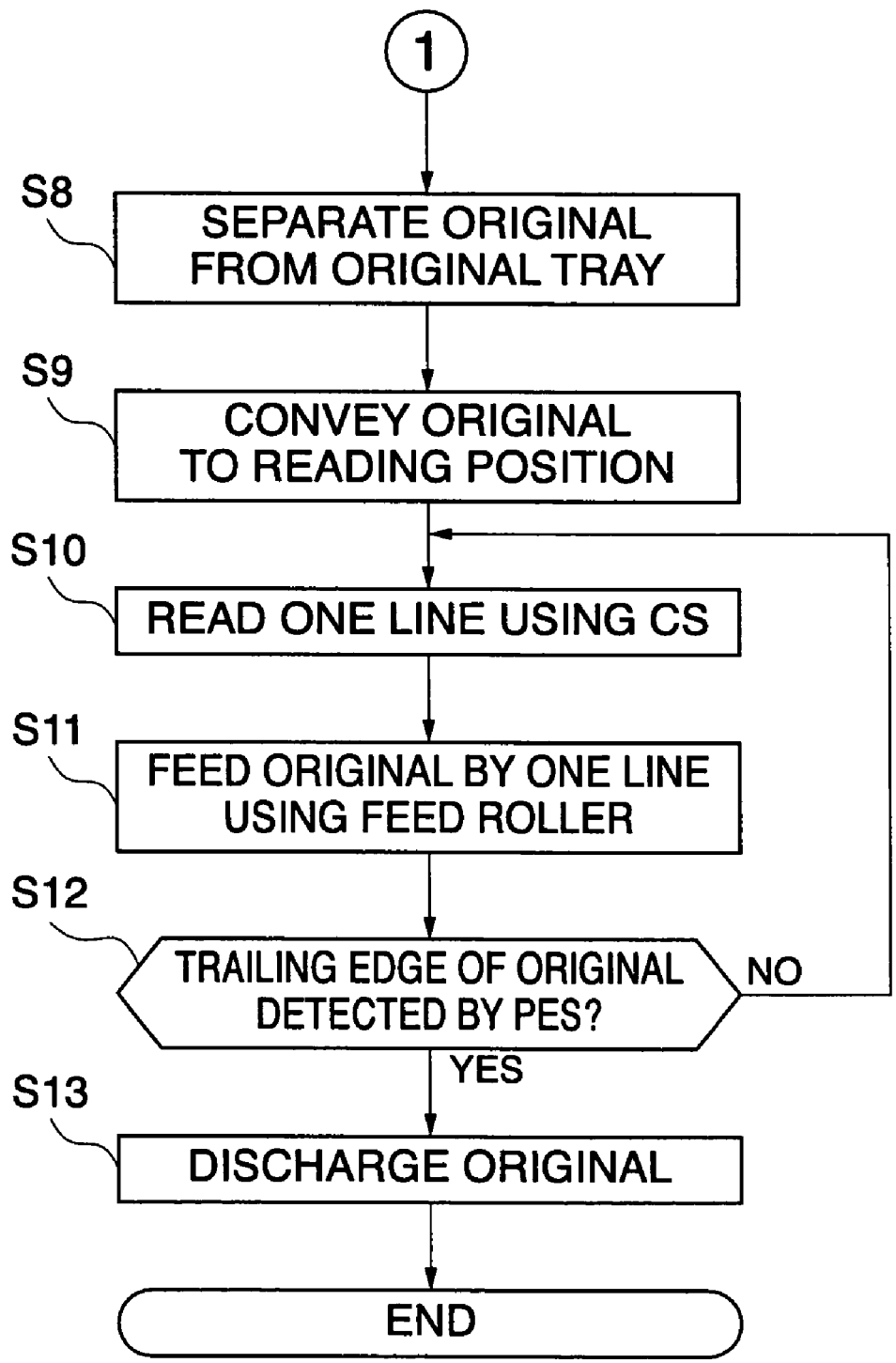
FIG. 9 is a continued part of the flowchart of FIG. 8.
Figure 10:
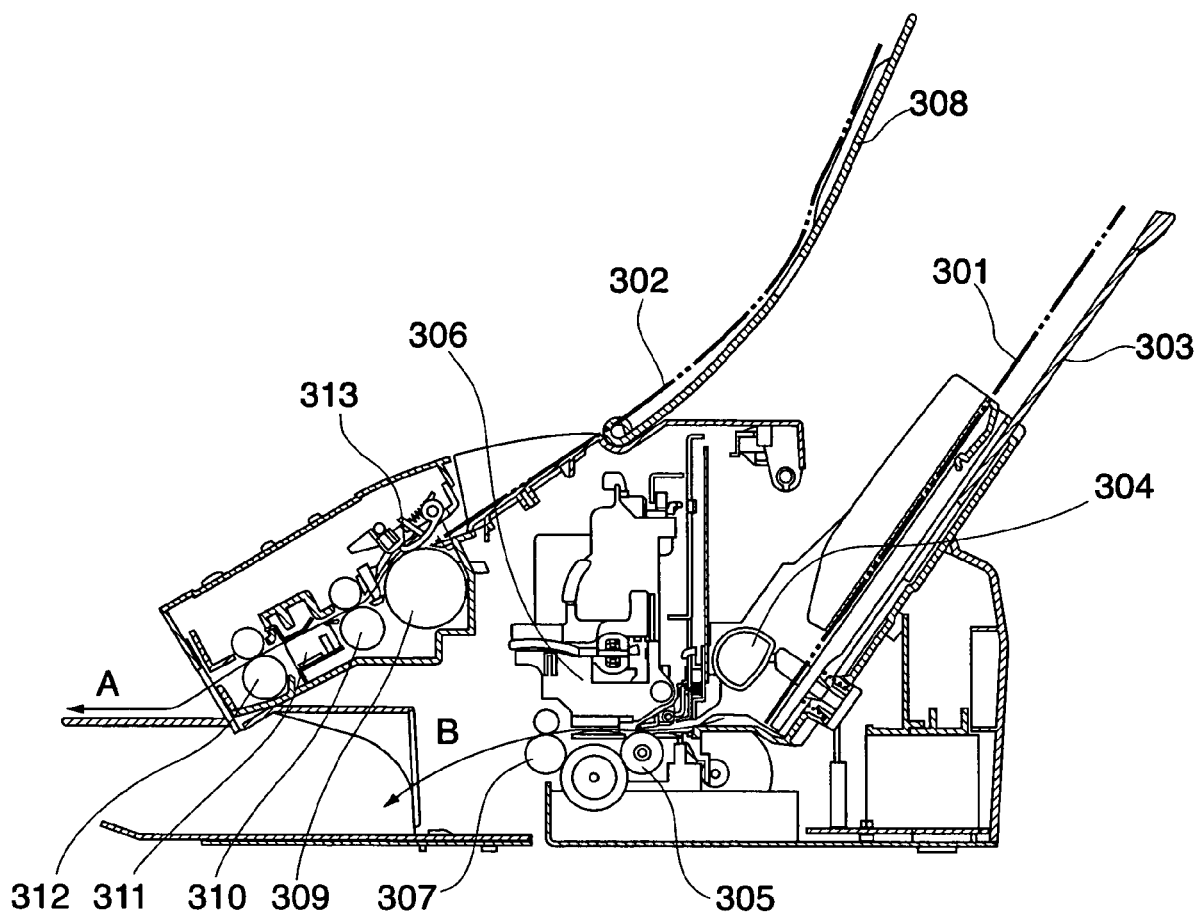
FIG. 10 is a cross-sectional view showing the construction of a conventional reading/recording apparatus.

FIGS. 8 and 9 are flowcharts showing the procedure of a control process for inhibiting a recording operation during a reading operation by the multifunction communication apparatus of FIG. 1. A control program for carrying out this process is stored in the ROM inside the storage section 107, described earlier, and is repeatedly executed by the CPU 100 at predetermined time intervals.

First, it is determined whether an original has been detected by the original detecting sensor (DS) 27 located near the original separating roller 15 (step S1). When an original 12 has not been detected, the processing in the step S1 is repeated.

On the other hand, when an original 12 has been detected, it is determined whether an instruction for reading operation has been given by the user via the operating section 106 (step S2). When an instruction for a reading operation has not been given, the process returns to the step S1. On the other hand, when an instruction for a reading operation has been given, the operation mode is updated to "reading mode" and is stored in an operation mode region in the storage section 107 (step S3).

Then, it is determined whether a conveyed medium has been detected on the shared conveying path by the PES 21 (step S4). When a conveyed medium has been detected, the feed roller 10 and the discharge roller 17 forcibly discharge the conveyed medium (step S5). This conveyed medium is determined to be a conveyed medium that has been present on the shared conveying path before the reading operation started, hence is not to be read, and is, therefore, forcibly discharged in the step S5. Then, the notification section 105 notifies the user that the operation of the recording unit 1 is inhibited (step S6), and after this, control is provided to inhibit the recording unit 1 from operating (step S7). On the other hand, when no conveyed medium has been detected by the PES 21 in step S4, the process proceeds directly to the step S6 and the processing in the steps S6 and S7 is carried out in the same way. As a result, according to the detection by the PES 21, the recording unit 1 is inhibited from carrying out an operation (such as an operation where the conveyed medium is identified as a recording sheet and the recording unit 1 is moved in the main scanning direction) that is not intended by the user.

After control has been carried out to inhibit the operation of the recording unit 1 in the step S7, preparations are made for the start of a reading operation. First, the driving force of the feed roller 10 is used to rotate the CS holder 26 to the reading position near the recording section on the platen 3, with the original separating roller 15 also being driven to separate one original 12 using the separating arm 13 (step S8) and the separated original being conveyed to the reading position (step S9). When the original 12 has been conveyed to the reading position, one line of an image on the original 12 is read by the CS 22 (step S10), and after one line of the image has been read, the original 12 is fed the equivalent of one line forwards by the feed roller 10 (step S11).

It is then determined whether the PES 21 has detected the trailing edge of the original 12 (step S12). When the trailing edge of the original 12 has not been detected, the processing in the step S10 and the processing in the step S11 are repeated in that order until the trailing edge of the original 12 is detected. On the other hand, when the trailing edge of the original 12 has been detected in the step S12, the original 12 is discharged from the apparatus by the discharge roller 17 (step S13) and the present process is terminated.

As described above, according to the multifunction communication apparatus of the present embodiment, when the reading unit 30 and the recording unit 1 move within a shared space on a shared conveying path used for conveying both originals and recording sheets, a recording operation is inhibited during a reading operation. As a result, it is possible to avoid an erroneous operation where an original is mistakenly identified as a recording sheet and the recording unit 1 moves in the main scanning direction. It is, therefore, possible to prevent the reading unit 30 and the recording unit 1 from colliding.

Moreover, by forcibly discharging an original when the original has been detected on the shared conveying path by the PES 21 before a reading operation starts, it is possible to avoid damage to the original or the occurrence of a paper jam due to the recording unit 1 moving in a state where the original remains on the shared conveying path due to a paper jam, power failure, or other reason. It is also possible to reduce the time spent on exclusive control operation of one of the reading unit 30 and the recording unit 1 within the shared moving space, thereby suppressing delays in reading and recording operations.

The present invention is not limited to the above described embodiment and can be applied to any construction that can achieve the functions described in the appended claims or the functions of the construction of the above described embodiment.

For example, although the present invention is applied to a multifunction communication apparatus with a facsimile communication function and a copying function in the above embodiment, the present invention is not limited to a facsimile apparatus, a copier, or the like, and can be applied to a variety of appliances that can perform a reading operation for an original and a recording operation.

What is claimed is:

1. A reading/recording apparatus comprising:
    a shared conveying path used as both a conveying path for an original and a conveying path for a recording medium;
    an original conveying device that conveys the original to a reading position on said shared conveying path;
    a reading device that is freely movable between the reading position and a reading standby position away from the reading position and reads an image of the original at the reading position;
    a recording medium conveying device that conveys the recording medium to a recording position on said shared conveying path;
    a recording device that moves within a same space on said shared conveying path as said reading device, is freely movable between the recording position and a recording standby position away from the recording position, and records an image on the recording medium at the recording position;
    a control device that inhibits an operation of said recording device at a start of a reading operation by said reading device; and
    an operation mode storage device that stores an operation mode,
    wherein the reading device and the printing device share the same space when the reading device is in the reading position and the printing device is in the printing position, and
    wherein inhibiting control of said control device corresponds to the stored operation mode having been undated to a reading mode.

2. A reading/recording apparatus according to claim 1, wherein said recording device is freely movable in a main scanning direction on said shared conveying path, and said control device causes said recording device to stay at the recording standby position away from the recording position during the reading operation by said reading device.

3. A reading/recording apparatus according to claim 1, comprising a rotary shaft extending in a main scanning direction, and wherein said reading device is freely rotatable about said rotary shaft between the reading position and the reading standby position, and said control device is responsive to said reading device having read an image of the original at the reading position on said shared conveying path, for causing said reading device to the reading standby position away from the reading position.

4. A reading/recording apparatus according to claim 1, comprising a conveyed medium detecting device that detects a conveyed medium on said shared conveying path, and a forcible discharging device operable when the conveyed medium has been detected on said shared conveying path by said conveyed medium detecting device at the start of the reading operation, to forcibly discharge the conveyed medium.

5. A reading/recording apparatus according to claim 4, further comprising a notification device operable when the conveyed medium has been detected on said shared conveying path by said conveyed medium detecting device at the start of the reading operation, to issue a notification that the conveyed medium has been detected.

6. A reading/recording control method for a reading/recording apparatus including a shared conveying path used as both a conveying path for an original and a conveying path for a recording medium, a reading device that is freely movable between a reading position on the shared conveying path and a reading standby position away from the reading position and reads an image of the original, and a recording device that moves within a same space on the shared conveying path as the reading device, is freely movable between a recording position on the shared conveying path and a recording standby position away from the recording position, and records an image on the recording medium, wherein the reading device and the printing device share the same space when the reading device is in the reading position and the printing device is in the printing position, the method comprising:
    an original conveying step of conveying the original to the reading position;
    a reading step of reading an image of the original at the reading position by the reading device;
    a recording medium conveying step of conveying the recording medium to the recording position;
    a recording step of causing the recording device to record an image on the recording medium at the recording position;
    a recording inhibiting step of inhibiting an operation of the recording device at a start of a reading operation by the reading device; and
    an operating mode storage step of storing an operation mode,
    wherein inhibiting control of said recording inhibiting step corresponds to the stored operation mode having been undated to a reading mode.

7. A reading/recording apparatus according to claim 1, wherein the reading device includes a contact image sensor and the printing device includes an ink cartridge, and wherein the contact image sensor and the ink cartridge share the same space when the reading device is in the reading position and the printing device is in the printing position.

8. A reading/recording control method according to claim 6, wherein the reading device includes a contact image sensor and the printing device includes an ink cartridge, and wherein the contact image sensor and the ink cartridge share the same space when the reading device is in the reading position and the printing device is in the printing position.

* * * * *